US007930556B2

(12) United States Patent
Shih

(10) Patent No.: US 7,930,556 B2
(45) Date of Patent: Apr. 19, 2011

(54) FINGERPRINT SYSTEM AND METHOD FOR ACCESS CONTROL

(75) Inventor: Pi-Feng Shih, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 731 days.

(21) Appl. No.: 11/953,874

(22) Filed: Dec. 11, 2007

(65) Prior Publication Data

US 2009/0083839 A1 Mar. 26, 2009

(30) Foreign Application Priority Data

Sep. 24, 2007 (CN) .......................... 2007 1 0201834

(51) Int. Cl.
*H04L 9/32* (2006.01)
*H04L 9/28* (2006.01)
*G06F 21/00* (2006.01)

(52) U.S. Cl. ........................................... 713/186; 726/7

(58) Field of Classification Search ........................ None
See application file for complete search history.

(56) References Cited

U.S. PATENT DOCUMENTS

| | | | | |
|---|---|---|---|---|
| 7,158,777 | B2 * | 1/2007 | Lee et al. | 455/411 |
| 7,287,165 | B2 | 10/2007 | Aono et al. | |
| 7,493,487 | B2 * | 2/2009 | Phillips et al. | 713/168 |
| 7,519,816 | B2 * | 4/2009 | Phillips et al. | 713/168 |
| 7,539,863 | B2 * | 5/2009 | Phillips et al. | 713/168 |
| 7,540,024 | B2 * | 5/2009 | Phillips et al. | 726/20 |
| 7,664,961 | B2 * | 2/2010 | Blattner et al. | 713/186 |
| 7,685,263 | B2 * | 3/2010 | Redjaian et al. | 709/220 |
| 7,793,109 | B2 * | 9/2010 | Ortiz | 713/186 |
| 2002/0170064 | A1 * | 11/2002 | Monroe et al. | 725/105 |
| 2004/0077335 | A1 * | 4/2004 | Lee et al. | 455/410 |
| 2006/0110012 | A1 * | 5/2006 | Ritter | 382/115 |
| 2007/0046476 | A1 * | 3/2007 | Hinkamp | 340/573.1 |
| 2007/0282754 | A1 * | 12/2007 | Owen et al. | 705/64 |
| 2009/0150671 | A1 * | 6/2009 | Abe | 713/169 |
| 2010/0194571 | A1 * | 8/2010 | Ortiz et al. | 340/572.1 |
| 2010/0275014 | A1 * | 10/2010 | Kelley | 713/157 |

FOREIGN PATENT DOCUMENTS

| | | | |
|---|---|---|---|
| CN | 1527224 | A | 9/2004 |
| CN | 1567346 | A | 1/2005 |
| CN | 1272519 | C | 8/2006 |
| CN | 101030244 | A | 9/2007 |

* cited by examiner

*Primary Examiner* — Christopher A Revak
(74) *Attorney, Agent, or Firm* — Frank R. Niranjan

(57) ABSTRACT

A fingerprint method for access control includes the steps of: providing an application server (20) for controlling access of different users; providing a database (40) connected to the application server for storing original fingerprint data of each user; scanning a fingerprint of a user through a handheld device (10), and obtaining fingerprint data of the scanned fingerprint; establishing a wireless communication channel between the handheld device and the application server, and transmitting the fingerprint data to the application server through the wireless communication channel; receiving the fingerprint data from the handheld device by the application server; determining whether the fingerprint data is the same as the original fingerprint data of the user in the database; and the user to access an access control device (30) connected to the application server if the fingerprint data is the same as the original fingerprint data stored in the database. A fingerprint system for access control is also provided.

4 Claims, 2 Drawing Sheets

FINGERPRINT SYSTEM AND METHOD FOR ACCESS CONTROL

BACKGROUND OF THE INVENTION

1. Field of the Invention

The present invention generally related to systems and methods for access control, and more particularly to a fingerprint system and method for access control.

2. Description of Related Art

Currently, access control systems include password identification systems, card identification systems, and portrait identification systems. Comparing with the password identification system and the card identification system, the portrait identification system is more secure. The portrait identification system generally includes a fingerprint identification technology and a face identification technology. The face identification technology is inefficient due to changes of angles, extraneous light, and makeup. Thus, the fingerprint identification technology is the preferred choice of the access control system.

However, the current fingerprint identification technology has some disadvantages. For example, a controller and a fingerprint identifier in the access control system compose an entity, in which some control lines, such as the input line of the fingerprint identifier, are exposed outside an access control device and can easily be destroyed by other people or other objects. Therefore, the current fingerprint identification technology still needs to be improved.

Accordingly, what is needed is a fingerprint system and method for access control whereby a fingerprint of a user is scanned by utilizing a handheld device.

SUMMARY OF THE INVENTION

One preferred embodiment provides a fingerprint system for access control. The fingerprint system includes an application server, a database connected to the application server, an access control device and a handheld device. The database is configured for storing original fingerprint data of each user. The handheld device includes a fingerprint identification device, a fingerprint data obtaining module and a transmitting module. The application server includes a receiving module, a decrypting module and a comparing module. The fingerprint identification device is configured for scanning a fingerprint of a user. The fingerprint data obtaining module is configured for obtaining fingerprint data of the scanned fingerprint. The transmitting module is configured for establishing a wireless communication channel between the handheld device and the application server, and transmitting the fingerprint data to the application server through the wireless communication channel. The receiving module is configured for receiving the fingerprint data from the handheld device. The comparing module is configured for determining whether the fingerprint data is the same as the original fingerprint data of the user stored in the database. The controlling module is configured for allowing the user to access the access control device if the fingerprint data is the same as the original fingerprint data stored in the database.

Another preferred embodiment provides a fingerprint method for access control. The method includes the steps of: providing an application server for controlling access of different users; providing a database connected to the application server for storing original fingerprint data of each user; scanning a fingerprint of a user through a handheld device, and obtaining fingerprint data of the scanned fingerprint; establishing a wireless communication channel between the handheld device and the application server, and transmitting the fingerprint data to the application server through the wireless communication channel; receiving the fingerprint data from the handheld device by the application server; determining whether the fingerprint data is the same as the original fingerprint data of the user in the database; and allowing the user to access an access control device connected to the application server if the fingerprint data is the same as the original fingerprint data stored in the database.

Other systems, methods, features, and advantages will be or become apparent to one skilled in the art upon examination of the following drawings and detailed description.

DETAILED DESCRIPTION OF THE INVENTION

Figure 1:
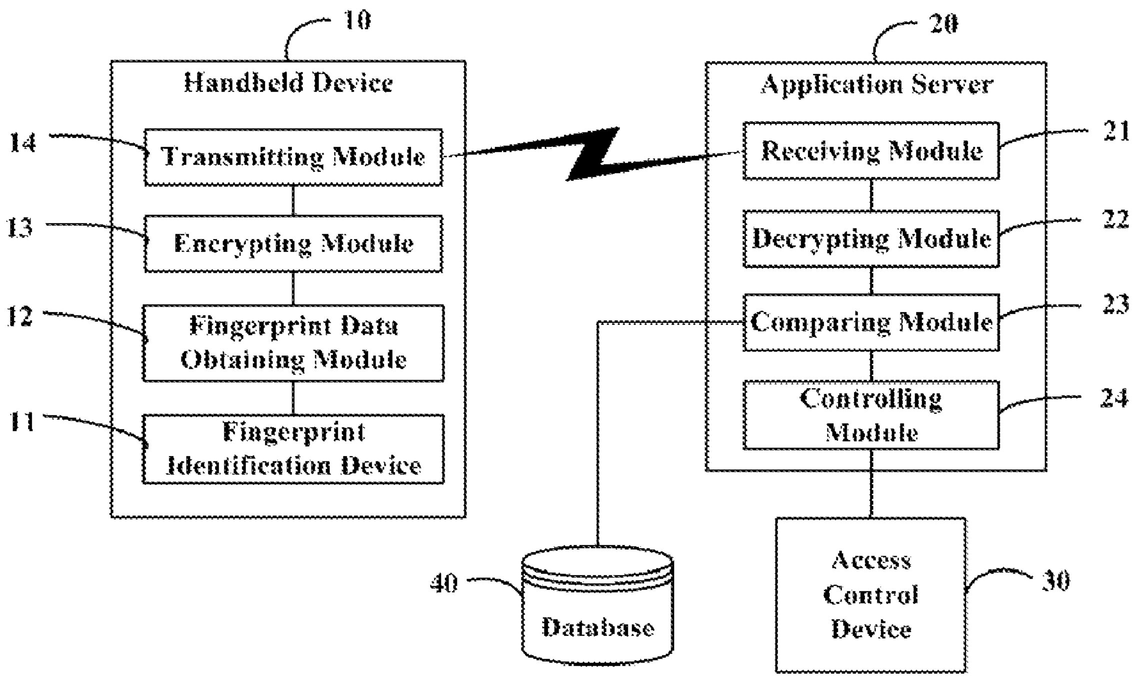
FIG. 1 is a block diagram of a fingerprint system for access control in accordance with one preferred embodiment of the present invention.

FIG. 1 is a block diagram of a fingerprint system for access control in accordance with one preferred embodiment of the present invention. The fingerprint system typically includes a handheld device 10, an application server 20, an access control device 30 and a database 40.

The access control device 30 and the database 40 are connected to the application server 20. The handheld device 10 is a wireless communication device, which can wirelessly communicate with the application server 20. The handheld device 10 may be a mobile phone, a personal digital assistant (PDA), a palm computer or any other handheld devices that can be used for wireless communication. The database 40 is configured for storing original fingerprint data of each user.

The handheld device 10 includes a fingerprint identification device 11, a fingerprint data obtaining module 12, an encrypting module 13 and a transmitting module 14. The application server 20 includes a receiving module 21, a decrypting module 22, a comparing module 23 and a controlling module 24.

The fingerprint identification device 11 is configured for scanning a fingerprint of a user. The fingerprint identification device 11 may be a camera or any other scanning device. The fingerprint data obtaining module 12 is configured for obtaining fingerprint data of the scanned fingerprint.

The encrypting module 13 is configured for encrypting the fingerprint data. In the present embodiment, the encrypting module 13 encrypts the fingerprint data with a public key that is provided by the application server 20. In other embodiment, the encrypting module 13 can encrypt the fingerprint data with other methods or technologies.

The transmitting module 14 is configured for establishing a wireless communication channel between the handheld device 10 and the application server 20, and transmitting the encrypted fingerprint data to the application server 20 through the wireless communication channel. The wireless communication channel may be a Bluetooth channel, a global system for mobile communications (GSM) channel, a general packet radio service (GPRS) channel, a code division multiple access (CDMA) channel or a wireless fidelity (Wi-Fi) channel.

The receiving module 21 is configured for receiving the encrypted fingerprint data from the handheld device 10.

The decrypting module 22 is configured for decrypting the encrypted fingerprint data. In the preferred embodiment, the decrypting module 22 decrypts the encrypted fingerprint data with a private key corresponding to the public key of the encrypting module 13. In other embodiment, the decrypting module 22 can encrypt the fingerprint data with other methods or technologies corresponding with the encrypting module.

The comparing module 23 is configured for determining whether the decrypted fingerprint data is the same as the original fingerprint data of the user stored in the database 40.

The controlling module 24 is configured for allowing the user to access the access control device 30 if the decrypted fingerprint data is the same as the original fingerprint data stored in the database 40. The controlling module 24 is also configured for warning and denying the user access to the access control device 30 if the decrypted fingerprint data is not the same as the original fingerprint data stored in the database 40.

Figure 2:
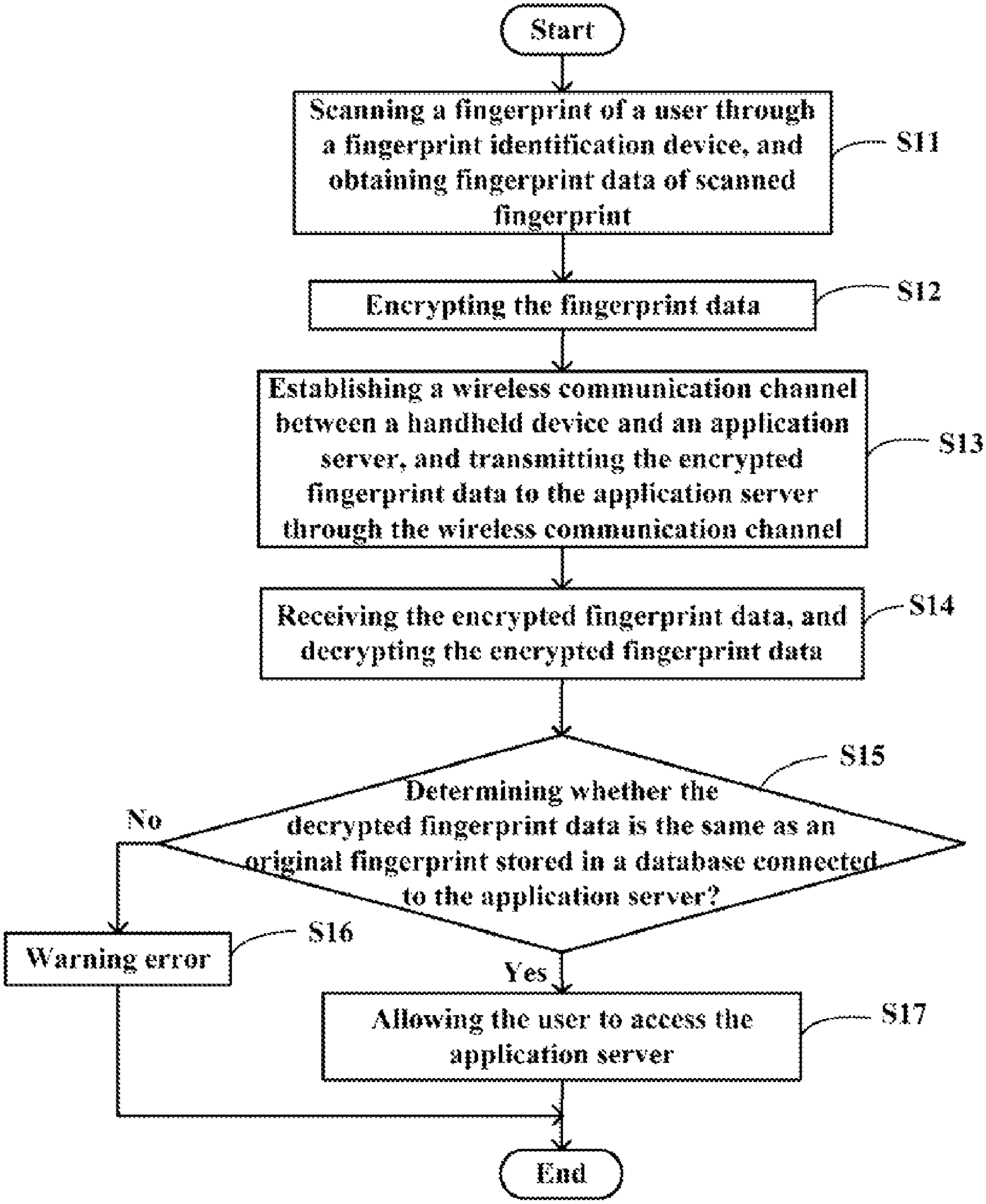
FIG. 2 is a flowchart of a fingerprint method for access control in accordance with one preferred embodiment of the present invention.

FIG. 2 is a flowchart of a fingerprint method for access control in accordance with one preferred embodiment of the present invention.

In step S11, the fingerprint identification device 11 scans a fingerprint of a user, and the fingerprint data obtaining module 12 obtains fingerprint data of the scanned fingerprint.

In step S12, the encrypting module 13 encrypts the fingerprint data.

In step S13, the transmitting module 14 establishes a wireless communication channel between the handheld device 10 and the application server 20, and transmits the encrypted fingerprint data to the application server 20 through the wireless communication channel.

In step S14, the receiving module 21 receives the encrypted fingerprint data from the handheld device 10, and the decrypting module 22 decrypts the encrypted fingerprint data after received by the receiving module 21.

In step S15, the comparing module 23 determines whether the decrypted fingerprint data is the same as the original fingerprint data of the user stored in the database 40.

In step S16, if the decrypted fingerprint data is not the same as the original fingerprint data stored in the database 40, the controlling module 24 warns and denies the user access to the access control device 30.

In step S17, if the decrypted fingerprint data is the same as the original fingerprint data stored in the database 40, the controlling module 24 allows the user to access the access control device 30.

The present embodiments scans the fingerprint of the user by utilizing the handheld device 10, compares fingerprint data of the fingerprint with the original fingerprint data stored in the database 40, and allows the user to access the access control device 30 when the fingerprint data of the fingerprint is the same as the original fingerprint data. The present embodiments can ensure the user to access the access control device 30 security, and ensure the access control device 30 not been destroyed by other people or other objects easily.

It should be emphasized that the above-described preferred embodiments, are merely possible examples of implementations, merely set forth for a clear understanding of the principles of the invention. Many variations and modifications may be made to the above-described preferred embodiment(s) without departing substantially from the spirit and principles of the invention. All such modifications and variations are intended to be included herein within the scope of this disclosure and the above-described preferred embodiment(s) and protected by the following claims.

What is claimed is:

1. A fingerprint identification system for access control, the fingerprint identification system comprising:

an application server for controlling access of different users;

a database, connected to the application server, configured for storing original fingerprint data of each user;

a handheld device comprising:

a fingerprint identification device configured for scanning a fingerprint of a user;

a fingerprint data obtaining module configured for obtaining fingerprint data of the scanned fingerprint;

an encrypting module configured for encrypting the fingerprint data with a public key that is provided by the application server;

a transmitting module configured for establishing a wireless communication channel between the handheld device and the application server, and transmitting the encrypted fingerprint data to the application server through the wireless communication channel;

the application server comprising:

a receiving module configured for receiving the fingerprint data from the handheld device;

a decrypting module for decrypting the encrypted fingerprint data with a private key corresponding to the public key;

a comparing module configured for determining whether the decrypted fingerprint data is the same as the original fingerprint data of the user stored in the database; and a controlling module configured for allowing the user to access an access control device connected to the application server if the decrypted fingerprint data is the same as the original fingerprint data stored in the database.

2. The system according to claim 1, wherein the controlling module is further configured for warning and denying the user access to the access control device if the decrypted fingerprint data is not the same as the original fingerprint data stored in the database.

3. A fingerprint identification method for access control, the method comprising the steps of:

providing an application server for controlling access of different users;

providing a database connected to the application server for storing original fingerprint data of each user;

scanning a fingerprint of a user through a handheld device, and obtaining fingerprint data of the scanned fingerprint;

encrypting the fingerprint data with a public key that is provided by the application server;

establishing a wireless communication channel between the handheld device and the application server, and transmitting the encrypted fingerprint data to the application server through the wireless communication channel;

receiving the encrypted fingerprint data from the handheld device by the application server;

decrypting the encrypted fingerprint data with a private key corresponding to the public key;

determining whether the decrypted fingerprint data is the same as the original fingerprint data of the user in the database; and allowing the user to access an access control device connected to the application server if the decrypted fingerprint data is the same as the original fingerprint data stored in the database.

4. The method according to claim 3, further comprising the step of warning and denying the user access to the access control device if the decrypted fingerprint data is not the same as the original fingerprint data stored in the database.

* * * * *